United States Patent [19]
Reeves et al.

[11] Patent Number: 5,808,645
[45] Date of Patent: Sep. 15, 1998

[54] REMOVABLE APPLICATOR ASSEMBLY FOR APPLYING A LIQUID LAYER

[75] Inventors: Barry D. Reeves, Lake Oswego; Clark W. Crawford, Wilsonville; Brent R. Jones, Tualatin; Gerard H. Rousseau, Portland; John A. Wright, Mollala, all of Oreg.

[73] Assignee: Tektronix, Inc., Wilsonville, Oreg.

[21] Appl. No.: 382,453

[22] Filed: Jan. 31, 1995

Related U.S. Application Data

[63] Continuation-in-part of Ser. No. 97,332, Jul. 23, 1993, which is a continuation-in-part of Ser. No. 981,646, Nov. 25, 1992, Pat. No. 5,389,958.

[51] Int. Cl.$^6$ ...................................................... B41J 2/01
[52] U.S. Cl. ............................................ 347/103; 347/101
[58] Field of Search ................................. 347/103, 104, 347/213; 355/256–258, 273, 296–297, 261, 300; 118/659; 248/225.31, 316.6; 399/239, 127

[56] References Cited

U.S. PATENT DOCUMENTS

| | | | |
|---|---|---|---|
| 3,819,284 | 6/1974 | Kreuzer | 401/151 |
| 3,968,770 | 7/1976 | Marrs | 118/227 |
| 4,158,498 | 6/1979 | Ohmori | 355/15 |
| 4,400,079 | 8/1983 | Landa | 355/256 |
| 4,538,156 | 8/1985 | Durkee et al. | 346/21 |
| 4,673,303 | 6/1987 | Sansone et al. | 400/126 |
| 5,019,868 | 5/1991 | Kubert et al. | 355/264 |
| 5,099,256 | 3/1992 | Anderson | 346/1.1 |
| 5,380,769 | 1/1995 | Titterington et al. | 523/161 |

FOREIGN PATENT DOCUMENTS

| | | |
|---|---|---|
| 91561 | 10/1983 | European Pat. Off. . |
| 525114B1 | 2/1993 | European Pat. Off. . |
| 7512307 | 12/1975 | Netherlands ............. 355/297 |

OTHER PUBLICATIONS

Gary J. Marsh, "Printers Face Challenges of '90's Tasks", Computer Technology Review, (Nov. 1988), vol. 8, No. 14, pp. 1, 19, 22.

*Primary Examiner*—Benjamin R. Fuller
*Assistant Examiner*—Charlene Dickens
*Attorney, Agent, or Firm*—Ralph D'Alessandro

[57] ABSTRACT

An apparatus and method are described for applying an intermediate transfer surface, in the form of a liquid layer, on a support surface that may be used in a phase change ink printing system. The apparatus includes an applicator assembly with a leak-free valving system for distributing the liquid layer onto the support surface to produce the intermediate transfer surface and a means for metering the liquid layer uniformly on the support surface. The applicator assembly has a wick contact surface for removing foreign matter from and delivering the liquid onto the support surface. An improved liquid dispensing system is provided to provide the liquid to the wick which becomes saturated and, when brought into contact with the rotatable support surface of a transfer drum, applies the liquid in a layer to the support surface to form a liquid intermediate transfer surface.

39 Claims, 14 Drawing Sheets

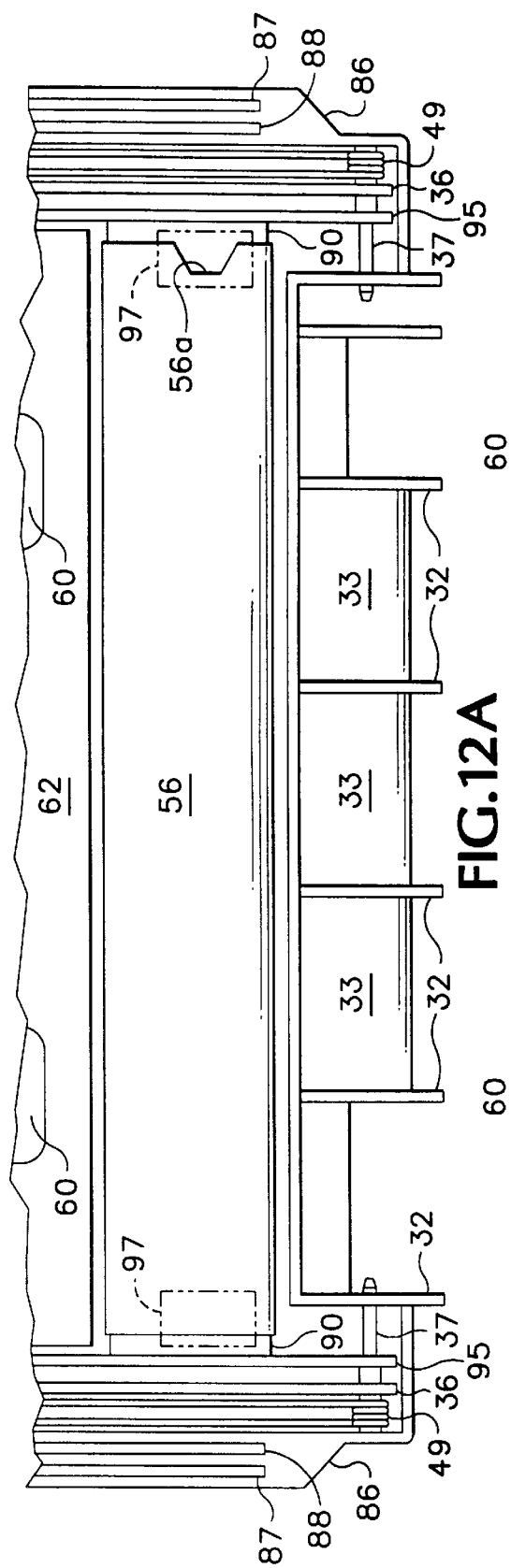
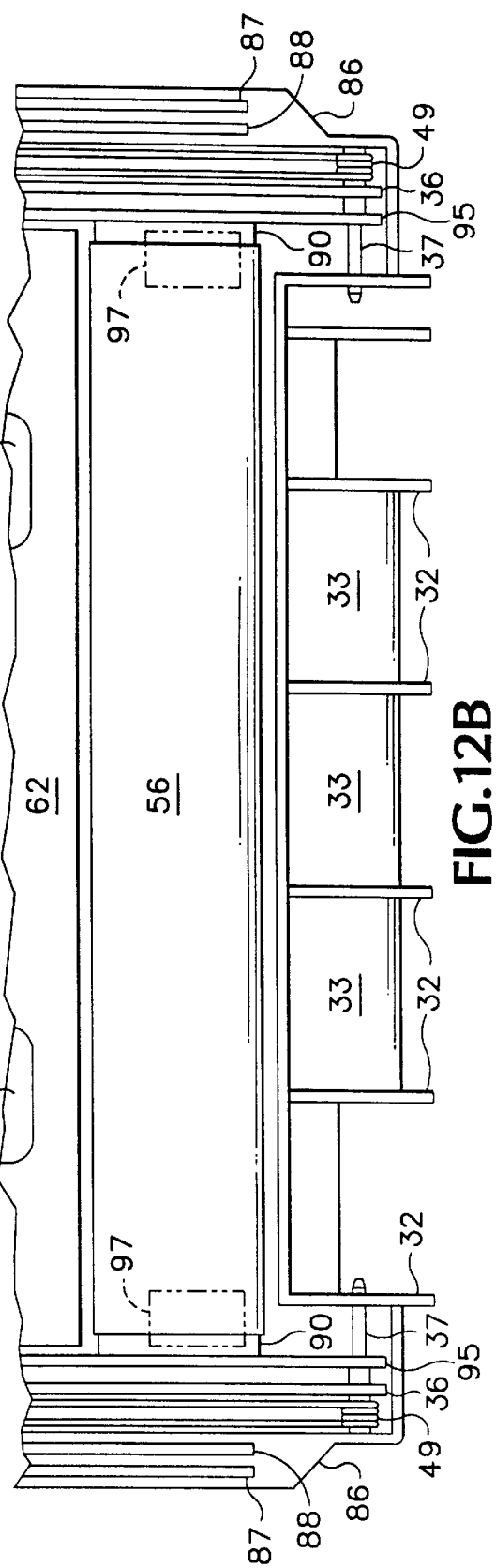

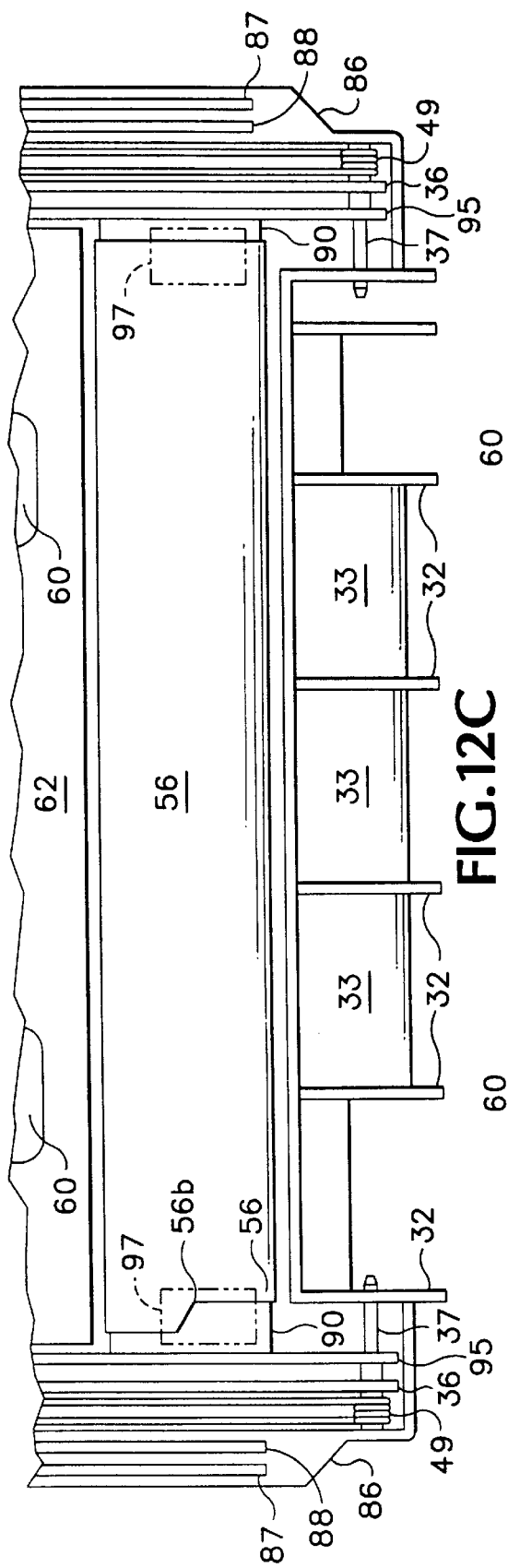
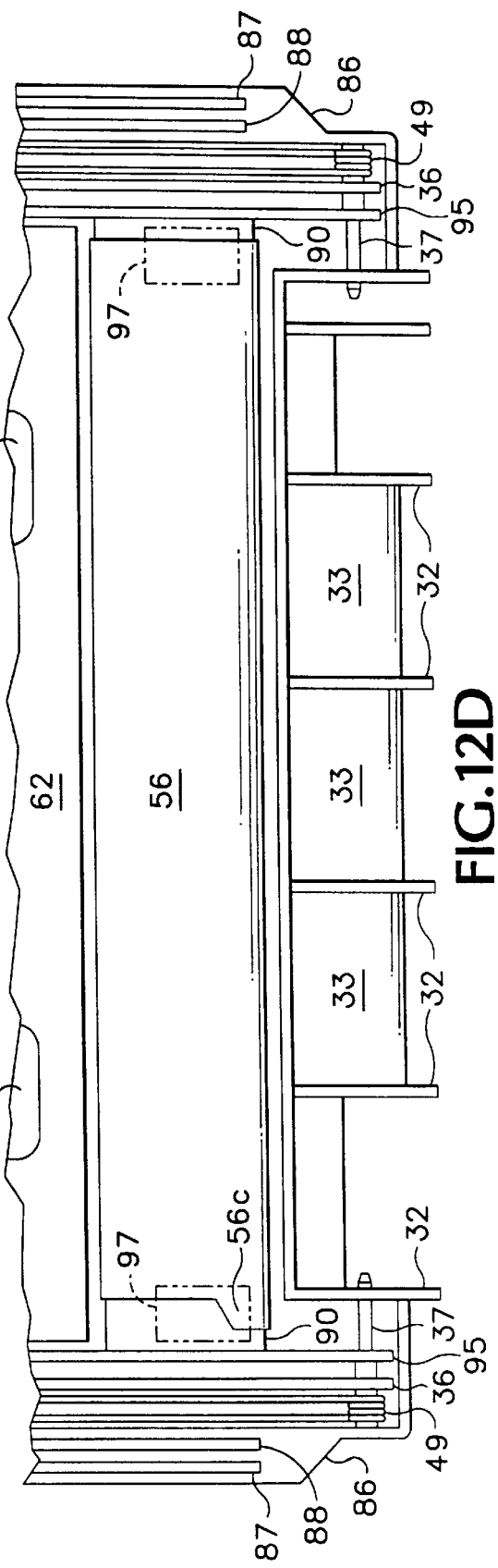

500
REMOVABLE APPLICATOR ASSEMBLY FOR APPLYING A LIQUID LAYER

This application is a continuation-in-part of U.S. patent application Ser. No. 08/097,332, filed Jul. 23, 1993, entitled "Intermediate Transfer Surface Application System", which is a continuation-in-part of Ser. No. 07/981,646, filed Nov. 25, 1992, now U.S. Pat. No. 5,389,958, issued Feb. 14, 1995, entitled "Imaging Process".

FIELD OF INVENTION

The present invention relates generally to an imaging process. More specifically, this invention relates to a replaceable transfer drum maintenance cartridge for use in a printer that applies a liquid intermediate transfer surface to the supporting surface of the transfer drum, cleans any untransferred ink or other debris from the supporting surface of the transfer drum and provides a replaceable receptacle to collect waste or purged ink from the ink jet print head which may be used in ink jet printing systems or the like. An improved liquid delivery system is employed with the cartridge, as well as an end of useful life indicator system.

BACKGROUND OF THE INVENTION

Ink jet printing systems have utilized intermediate transfer surfaces, such as that disclosed in U.S. Pat. No. 4,538,156 to Durkee et al. This patent discloses a system wherein an intermediate transfer drum is employed with a print head. The surface of the transfer drum may be of a plastic material, such as teflon, tefzel, mylar or the like. In addition, smooth metal or ceramic surfaces can be used. A final receiving surface of paper is brought into contact with the intermediate transfer drum after the image has been placed thereon by the nozzles in the print head. The image is then transferred to the final receiving surface. A cleaning medium is brought into contact with the intermediate transfer drum to prepare the surface of the drum prior to the next image being formed on the transfer surface.

U.S. Pat. No. 4,158,498 to Ohmori teaches a blade cleaning system for a reproducing apparatus wherein a doctor blade is in contact with an image transfer drum to remove residual toner from the drum during the photocopying process. When the copying process terminates, the doctor blade is rotated to a cleaning station where brushes remove any residual toner and foreign matter from the blade and applies a lubricant to the blade.

U.S. Pat. No. 5,099,256 to Anderson describes an intermediate drum with a surface which receives ink droplets from a print head. The intermediate drum surface is thermally conductive and formed from a suitable film-forming silicone polymer allegedly having a high surface energy and high degree of surface roughness to prevent movement of the ink droplets after receipt from the print head nozzles. Anderson teaches that the film-forming silicone polymer coating on the surface of the intermediate drum, enables substantially complete transfer of the dehydrated ink droplets therefrom to a recording medium, so that the removal of residual ink from the drum surface by the cleaning means, such as a blade is unnecessary. The teaching of Anderson, however, does not show how the film-forming silicone polymer is applied to the intermediate drum surface.

U.S. Pat. No. 4,673,303 to Sansone et al. discloses an offset ink jet postage printing method and apparatus in which an inking roll applies ink to the first region of a dye plate. A lubricating hydrophilic oil can be applied to the exterior surface of the printing drum or roll to facilitate the accurate transfer of the images from the drum or roll to the receiving surface.

Imaging systems using a liquid intermediate transfer surface require some sort of applicator assembly for metering the fluid onto the drum surface. One such applicator assembly has a felt wicking pad impregnated with the release fluid for applying the intermediate transfer surface to the drum. The use of such an applicator assembly suffers from a number of drawbacks. One is the amount of fluid delivered by the pad can be inconsistent and vary, as well as changing with time. Where an oil is used as the liquid for the intermediate transfer layer, it is especially important to have a simple and reliable, yet relatively inexpensive, dispensing system that does not leak or erratically dispense the oil. Containment of oil in an applicator assembly that may be removable from the imaging system prior to actual use of the system can be a problem created by the handling of the unit during transit or the orientation of the unit during storage. This is especially true if the normal oil delivery path is operational during these times.

Lack of control over the liquid intermediate transfer surface's distribution and thickness has negative effects on printed image quality. Non-uniform film distribution or improper film thickness around the drum results in undesirable image artifacts. Those areas of the surface that have more fluid may show up on the image as shiny spots or streaks. If the intermediate transfer surface becomes too thin or is absent, ink can adhere to the drum and not be transferred. This problem becomes even more critical when the final receiving surface for the image is an overhead transparency. Projection of the printed image magnifies areas of non-uniform fluid distribution.

What is needed is an intermediate transfer surface application system that overcomes the drawbacks of previous application systems. Such a system must provide a clean intermediate transfer surface free of residual material. Further such a system must simply and reliably deliver a uniform and consistent liquid intermediate transfer surface without leaking or spilling.

SUMMARY OF THE INVENTION

It is an aspect of the present invention that a transfer drum maintenance system is provided that applies an intermediate transfer layer, in the form of a liquid layer, onto the transfer drum support surface.

It is another aspect of the present invention that the transfer drum maintenance system removes any untransferred ink or other debris from the support surface.

It is yet another aspect of the present invention that the transfer drum maintenance system collects waste or purged ink in a removable and replaceable or reusable receptacle.

It is a feature of the present invention that the transfer drum maintenance system is a replaceable cartridge that can be removed from the printer.

It is another feature of the present invention that the transfer drum maintenance system includes a reservoir of liquid that is applied in the form of a liquid layer onto the transfer drum support surface as an intermediate transfer layer onto which is formed the ink image from an ink jet print head.

It is still another feature of the present invention that the replaceable transfer drum maintenance system contains an applicator assembly for distributing the liquid layer onto the transfer drum support surface to produce the liquid intermediate transfer surface and a means for metering the liquid layer uniformly on the support surface. The applicator assembly preferably uses a liquid impregnated wick as a contact medium to apply the liquid onto the transfer drum support surface and for removing foreign matter from the support surface. The release of the liquid from the oil reservoir is actuated by the movement of the wick assembly upwardly along a valve opening track as the wick assembly moves toward transfer drum support surface. The metering means is preferably a hydrodynamic wiper blade that uniformly distributes the liquid intermediate transfer layer over the support surface and utilizes a dam to contain and distribute a sufficient amount of liquid onto the support surface. The blade is made of an elastomeric material.

The method of applying the liquid intermediate transfer surface onto the support surface includes the steps of concurrently removing foreign matter from and distributing the liquid layer onto the support surface by employing a liquid impregnated contact medium in the form of a wick that contacts the support surface and, with the metering blade, distributes the liquid layer uniformly on the support surface. The contact medium or wick material is disposed on a wick assembly. The removing and distributing step further comprises the step of positioning the wick in contact with the support surface prior to the start of the metering step and removing the wick or contact medium from the support surface prior to the finishing of the metering step.

The liquid layer is a sacrificial layer on the supporting surface of the rotatable transfer drum 19 which can at least partially be transferred with the transferred image to the final receiving print medium. The print medium may be a transparency, paper or other suitable media.

The liquid layer is replenishable on the supporting surface for subsequent images and can at least partially be transferred with the image to the image receiving medium.

These and other objects, features and advantages are obtained by the apparatus and the method of utilizing that apparatus by applying a liquid layer with an elevatable wick assembly to a supporting surface such that the liquid layer presents a first surface to receive the image which enhances the transferability of that image to a final receiving print medium. The wick material on the wick assembly becomes impregnated with the liquid by the release of the liquid from a reservoir, the release being actuated by the elevation of the wick assembly along a dog-legged valve opening track and consequently outward movement of the valve stem in the replaceable drum maintenance cartridge.

BRIEF DESCRIPTION OF THE DRAWINGS

These and other objects, features and advantages of the invention will become apparent upon consideration of the following detailed disclosure of the invention, especially when it is taken in conjunction with the accompanying drawings wherein:

FIGS. 12A–D are top plan views of the drum maintenance cartridge with portions broken away to show a sensing system usable to indicate when the drum maintenance cartridge should be replaced because of depletion of the oil in the oil bladders;

DETAILED DESCRIPTION OF THE PREFERRED EMBODIMENT

Figure 1:
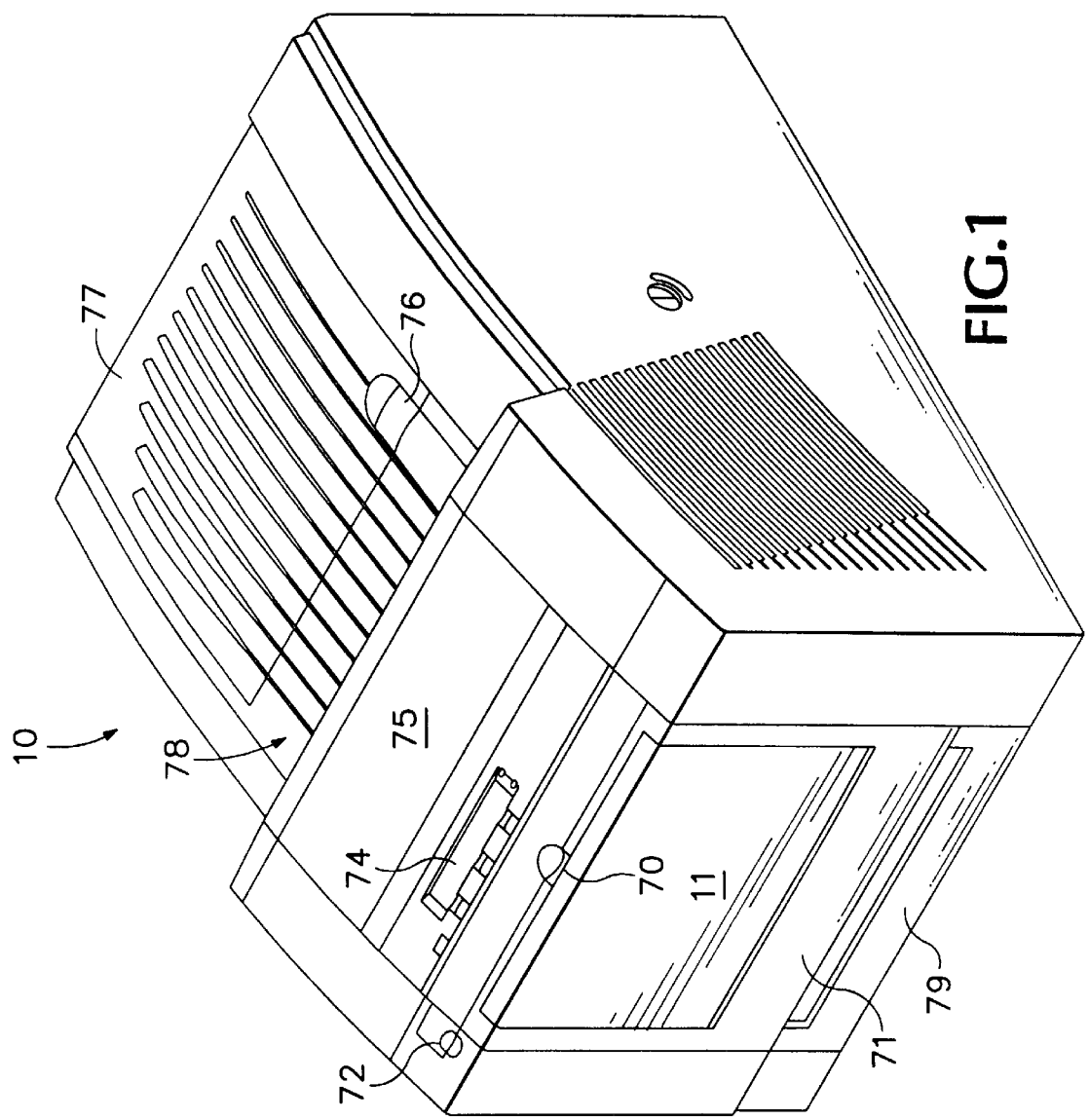
FIG. 1 is a side perspective view of a printer employing the present invention.

FIG. 1 shows a front perspective view of a printer indicated generally by the numeral 10 having a hinged front access door 11 retained in a closed position by a latch 73 (see FIG. 2 briefly) that is opened by pulling on the door at the front access door release recess 70. A paper or media tray 79 access handle is located beneath the jam access cover 71. Jam access cover 71 is releasable by opening the jam access cover release latch 72. Indications of jams or other conditions of which the operator needs to be informed are provided via the front display panel 74 that utilizes an appropriate display readout, such as light emitting diodes or thin film transistors.

Figure 2:
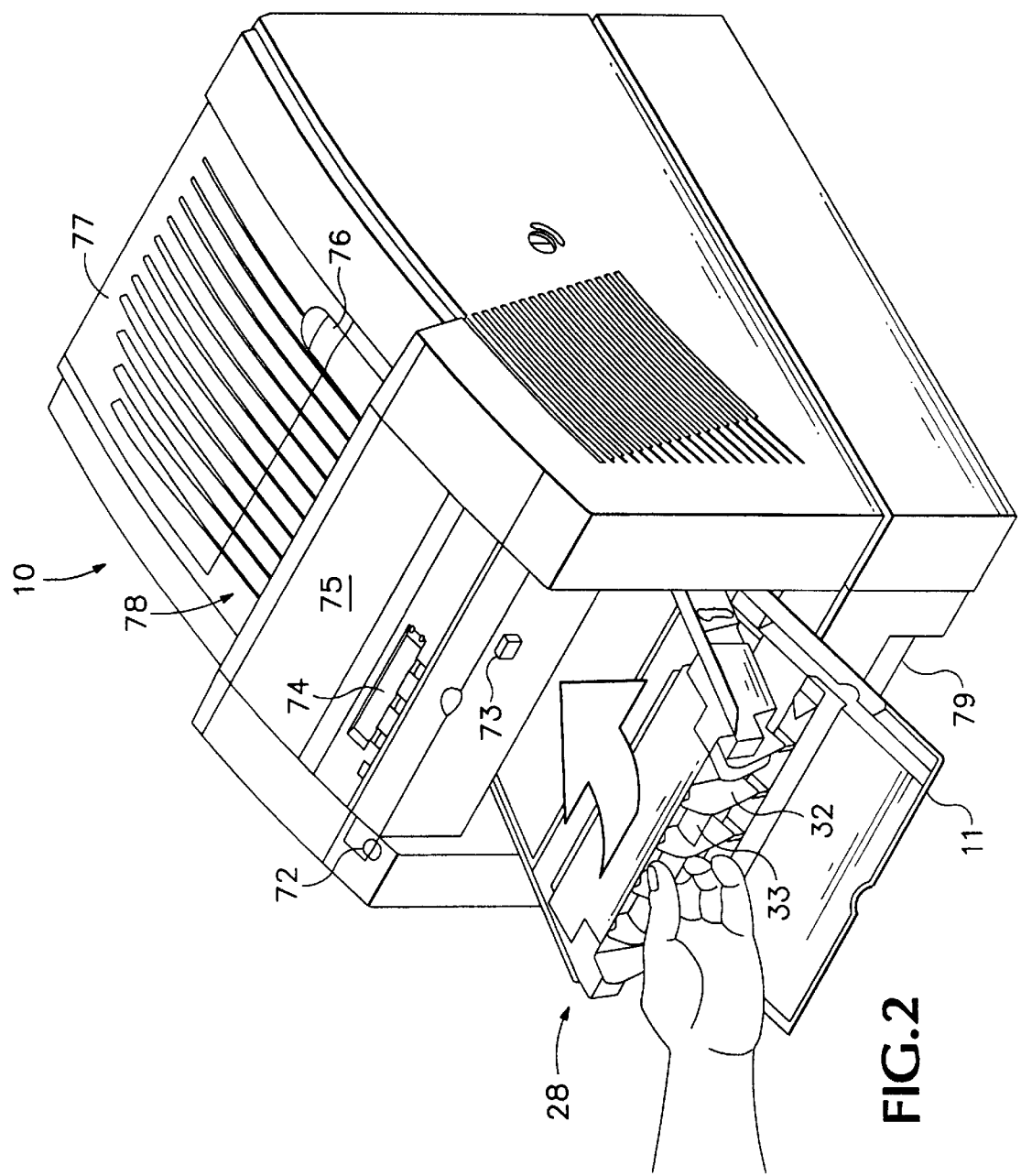
FIG. 2 is a front perspective view of a printer showing the drum maintenance cartridge being inserted.

FIG. 2 shows the printer 10 with the front access door lowered to provide access to the drum maintenance cartridge, indicated generally by the numeral 28. Jams can also be accessed through the media stripper mechanism access cover 75 and the aforementioned jam access cover 71. If a sheet of medium passes along the media pathway 24 (see FIG. 4 briefly) through the imaging process without any jams, it exits the printer 10 and is deposited in the media output area, indicated generally by the numeral 78, on top of the printer. The ink load and supply mechanism is accessible through the ink load access cover 77 by releasing the ink load access latch 76 and raising the cover 77 rearwardly to expose the ink load mechanism. The supply of inks can be replaced as necessary or as indicated by the read-out on the display panel 74.

Figure 4:
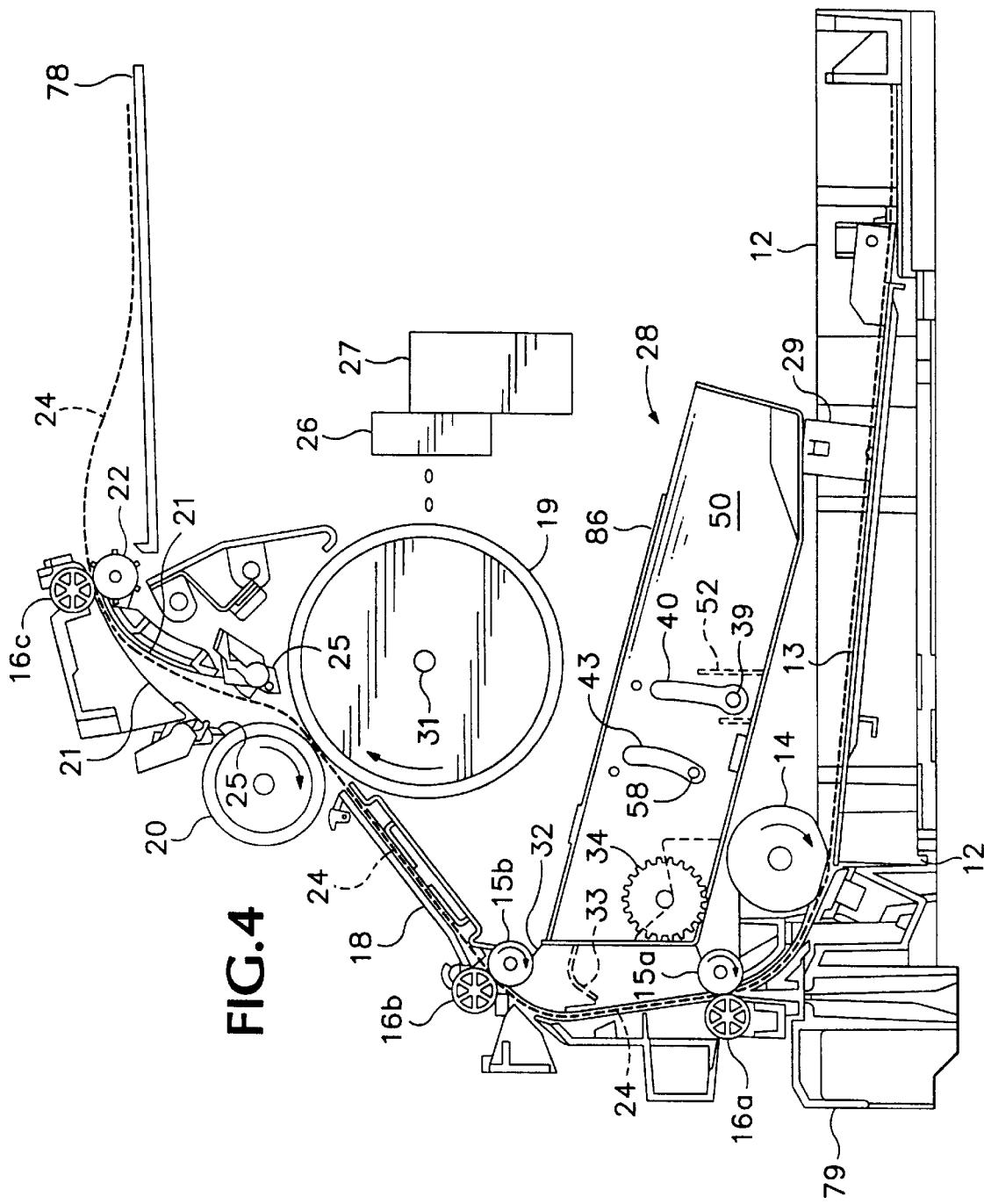
FIG. 4 is a side perspective view of the printer showing the drum maintenance cartridge relative to the media pathway through the printer, the media supply tray and the transfer drum.

FIG. 4 shows the media pathway 24 through the printer 10, starting with a sheet of print medium 13 positioned in the media tray 12 near the base of the printer 10. A media pick roller 14 is actuated by a controller (not shown) and moves the sheet of print media 13 forward into the successive transport rollers 15a and 15b, and specifically into the nip formed between the corresponding idler rollers 16a and 16b. A general upward movement of the sheet of print medium 13 along the media pathway 24 takes the sheet into the media preheater 18 after an appropriate staging period to synchronize the imaging process with the placement of a printed image by the print head 26 on the liquid intermediate transfer surface supported on the transfer drum 19. After an appropriate pause, the length of which is determined by the printer controller, a transfer roller 20 and the transfer drum 19 form a nip through which the print medium sheet 13 is pulled by the rotation of the transfer drum 19 and transfer roller 20, which has been moved, such as by activation of an eccentric shaft, towards transfer drum 19. The printed image is contact transferred from the transfer surface to the surface of the sheet of print medium 13 and then guided upwardly by the media guides 21 into the nip formed between the media exit drive roller 22 and its corresponding idler roller 16c. Media stripper mechanisms 25, in the form of stripper fingers, are employed to strip the sheet of print medium from the liquid coated surface of the transfer drum 19 and the surface of the transfer roller 20 in the event adhesion to either of these surfaces occur. The imaged sheet of print medium 13 then exits the printer 10 and comes to rest in the media output area or receiving tray 78.

Transparencies and paper are the primary intended media for image receipt. Paper commonly known as "plain paper" is the preferred medium, such as that supplied by Xerox Corporation and many other companies for use in photocopy machines and laser printers. Many other commonly available office papers are included in this category of plain papers, including typewriter grade paper, standard bond papers, and letterhead paper. Hammermill laser print paper is assumed to be a representative grade of plain paper that may be used with the printer of this invention.

Transfer roller 20 has a metallic core, preferably steel, with an elastomeric covering that contributes to a 40 to 45 Shore D rating for the overall system. Suitable elastomeric covering materials include silicones, urethanes, nitriles, EPDM and other appropriately resilient materials. The elastomeric covering on roller 20 engages the sheet of print medium 13 on the reverse side to which the ink image is transferred from the exposed surface of the liquid layer forming the intermediate transfer surface on the transfer drum 19. This fuses or fixes the ink image to the surface of the sheet of print medium so that the ink image is spread, flattened and adhered.

As stated previously, the ink supply unit (not shown) overlies the print head 26 and the reservoir 27 and supplies molten ink by the melting of the solid ink sticks by melt plates for each of the primary colors of cyan, yellow, magenta, and black. The ink is maintained in a liquid state in the reservoir 27 and fed to the print head 26 for propulsion upon demand, most normally through the use of piezoelectric transducers.

The phase change ink used to form images in the printer 10 employing the present invention must have the properties and characteristics disclosed in U.S. Pat. No. 5,372,852 issued Dec. 13, 1994 and assigned to the assignee of the present invention. The temperatures and rheological properties necessary for the application of this type of an ink and the thickness of the liquid intermediate transfer layer are also disclosed in the aforementioned patent.

The print head 26 is supported by an appropriate housing and support elements (not shown) for either stationary or moving utilization to place the ink in the liquid or molten state on the liquid intermediate transfer layer coating the surface of transfer drum 19. The intermediate transfer layer is applied to the supporting surface of the transfer drum in the manner which will be described hereafter. The liquid coated supporting surface is shown as a drum, but may also be a web, platen, belt, band or any other suitable design.

The supporting surface of transfer drum 19 may be formed from any appropriate material, such as metals including but not limited to aluminum, nickel or iron phosphate, elastomers including but not limited to fluoroelastomers, silicone rubber and polybutadiene, plastics including but not limited to polyphenylene sulfide loaded with polytetrafluorethylene, thermosets, ceramics or thermoplastics such as acetal resins, polyethylene, nylon, and FEP. Any appropriate material may be employed as long as the exposed surface is sufficiently rigid to deform the transferred ink image when the final receiving sheet of print medium passes between it and the transfer and fixing roller 20 and is sufficiently smooth so as not to interfere with the ability of the intermediate transfer surface or liquid layer to support the ink image. The preferred material is anodized aluminum.

Suitable liquids that may be applied to the support surface of transfer drum 19 as the liquid layer or intermediate transfer surface include water, fluorinated oils, glycol, surfactants, mineral oil, silicone oil, functional oils or combinations thereof. Functional oils can include, but are not limited to, mercapto-silicone oils, fluorinated silicone oils and the like. The preferred liquid is silicone oil.

Figure 5:
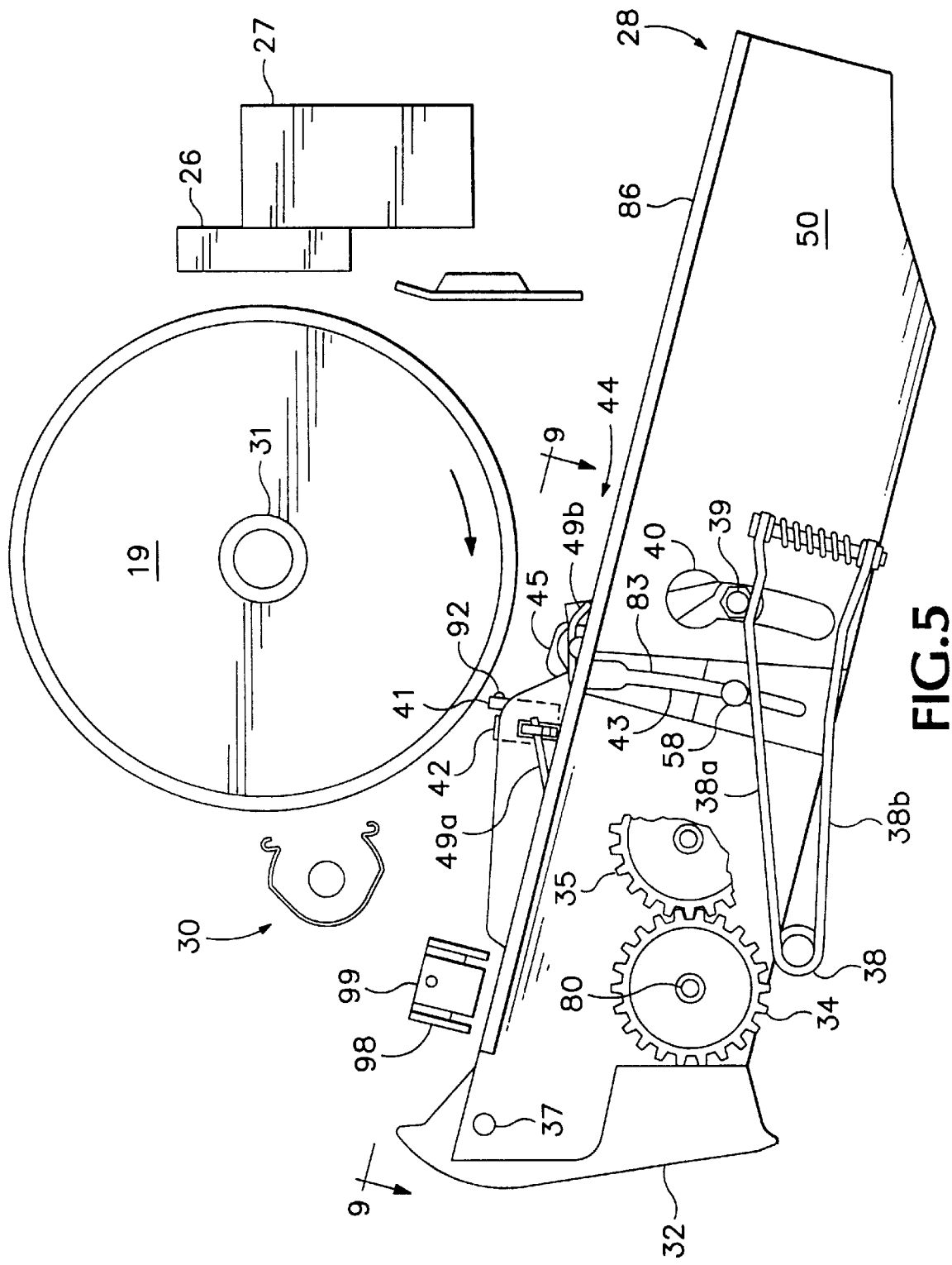
FIG. 5 is a diagrammatic illustration of the drum maintenance cartridge, the transfer drum and print head with the wick assembly for applying liquid to the transfer drum in a lowered position in the drum maintenance cartridge showing the relative positioning of drum maintenance cartridge, the transfer drum and the print head.

The liquid layer of oil applied by the wick 45 to form the intermediate transfer surface on the transfer drum 19 is brought to the same temperature as the drum surface almost upon contact with the drum surface. The surface of drum 19 is heated by heater assembly 30, indicated generally by the numeral 30 in FIGS. 5 and 6, normally initially upon start-up of the printer 10. Heater assembly 30 may be a radiant resistance heater positioned as shown, or alternatively positioned internally within the drum 19. Heater assembly 30 increases the temperature of the surface of the transfer drum 19 from ambient temperature to between about 25° C. to about 70° C. or higher, thereby bringing the temperature of the liquid intermediate transfer surface to the same level. A more preferred range is between about 30° C. to about 60° C., and a most preferred range is from about 45° C. to about 52° C.

Figure 6:
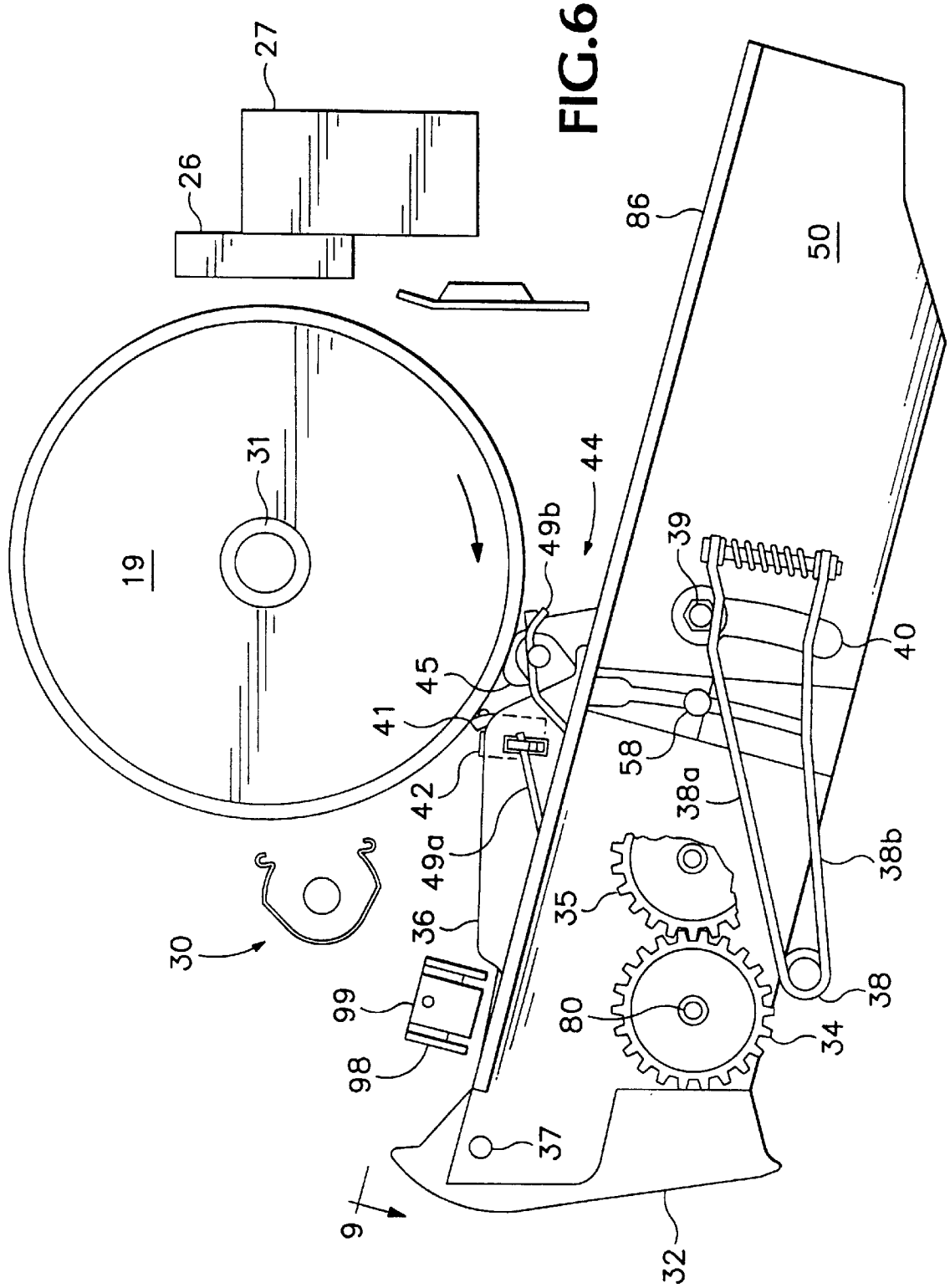
FIG. 6 is a diagrammatic illustration of the drum maintenance cartridge with the wick assembly in a raised position in the drum maintenance cartridge showing the relative positioning of the drum maintenance cartridge, the transfer drum and the print head.

FIG. 4 shows the drum maintenance cartridge 28 in its position relative to the media tray 12, the media pathway 24 and the transfer drum 19. Cartridge 28 is supported by a support mechanism 29, which also can be used to sense the presence of the cartridge 28 after removal and replacement from the printer 10. Cartridge 28 is in the form of a tray or drawer. Paper guides 32 located on the front of the cartridge 28 facilitate guiding the media sheets of print medium 13 along the media pathway 24 when the cartridge 28 is properly seated within the printer 10. As seen in FIG. 2, cartridge 28 is replaceable within the printer 10 by grasping the handle 33 and sliding the cartridge 28 in or out along the flanges 86 on both sides of the tray that are supported by appropriate guides (not shown) within the printer. FIGS. 3, 9, 10, 11a and 11b best show tracking ribs 87 and 88 that are positioned on the top on each of the side flanges 86 to help track the cartridge 28 in and out of the printer. As best seen in FIGS. 4 and 6, cartridge 28 has a wick assembly lift ear 39 extending out through a slot 40 and a notched oil spool valve stem 58 extending through a corresponding valve track slot 43 on both sidewalls 50 of the cartridge 28. The wick assembly is indicated generally by the numeral 44 in FIGS. 3–10.

Figure 3:
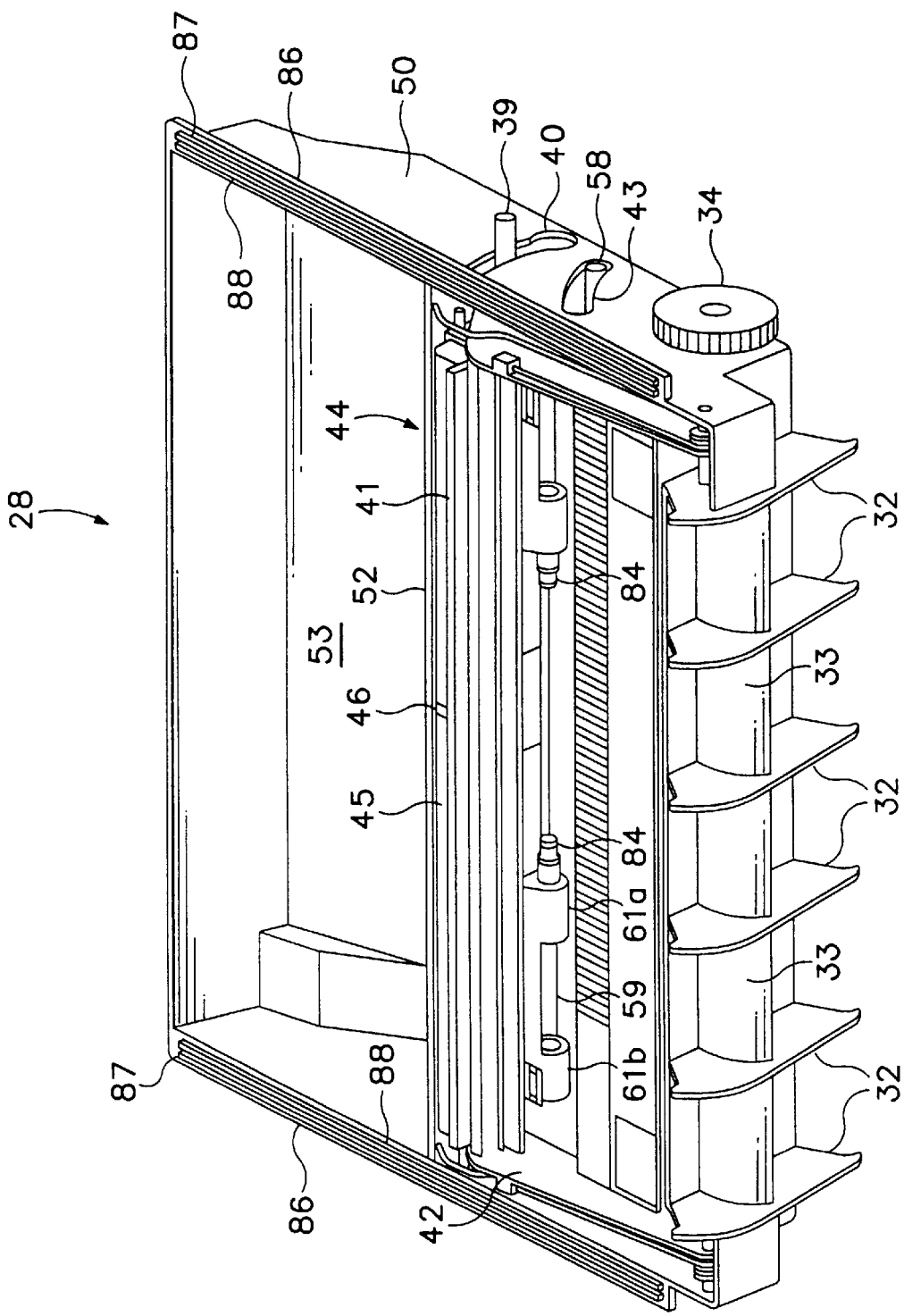
FIG. 3 is an axonometric view of a drum maintenance cartridge.

The cartridge 28 is divided into two areas by the baffle or retaining wall 52 with the wick assembly 44, web 56 and metering blade 41 in one area and the waste ink receptacle 51 in the other. A waste ink receptacle receiving area 53 is best seen in FIG. 3, into which the disposable or removable waste ink receptacle 51 is placed to collect waste ink that falls from the print head 26 during image processing or, more likely, during the print head purging/cleaning cycle. The display panel 74 of FIGS. 1 and 2 will display a message to the operator of printer 10 to the effect that the waste tray is full. The front cover 11 should then be opened and the cartridge 28 removed from the printer 10 to empty the waste ink from the receptacle 51. The receptacle 51 can then be replaced into the receptacle receiving area 53 and the cartridge 28 replaced in the printer 10 for use. Receptacle 51 can be biased by a spring or other mechanism (not shown) against the tray retaining wall 52, best seen in FIGS. 4, 7 and 8.

Operation of wick assembly 44 and the attached metering blade 41 with its blade support mechanism 42 seen in varying views in FIGS. 3–10, will be described hereafter. Wick assembly 44 moves between a fully lowered position, indicated by the position of the lift ear 39 in FIG. 4, to a fully raised position, indicated in FIGS. 6 and 8, where the wick 45 is in contact with the support surface of the rotatable transfer drum 19. The movement of wick assembly 44 is selectively controlled by the actuation of a cam (not shown) in the drive train of the printer 10 which contacts the cam follower 38 of FIG. 5. Cam follower 38 has an upper arm 38a and a lower arm 38b that are spring loaded and connected via a retaining pin. The upper arm 38a of cam follower 38 lifts the lift ear 39 upwardly in response to movement of the lower cam follower 38b by the cam of the drive train of the printer 10. This upward lifting causes the lift ear 39 and the attached wick assembly 44 to pivot about the shaft 80 on which also is mounted the web advance gear 34 and the web take-up roll 55 (see FIGS. 5–8). Wick assembly 44 and blade support mechanism 42 are moved in a four bar linkage assembly by the pivoting about shaft 80 of the lower wick assembly carrier arm 94 and the pivoting of the blade pivot arm 36 and the upper wick assembly carrier arm 95 about the pivot pin 37, best seen in FIGS. 7 and 8. This linkage arrangement allows for independent movement of the blade 41 and the wick 45 on wick assembly 44 when in contact with the surface of the transfer drum 19.

Blade preload spring 49 is also mounted about pivot pin 37 and biases the blade mount 42 upwardly with respect to the wick assembly 44. The upper arm of spring 49a is seated within a notch 91 that passes through an opening in the blade pivot arm 36 on the blade mount 42. The lower arm 49b of curved blade preload spring 49 rests atop the wick channel molded ear pin 96.

Figure 11A:
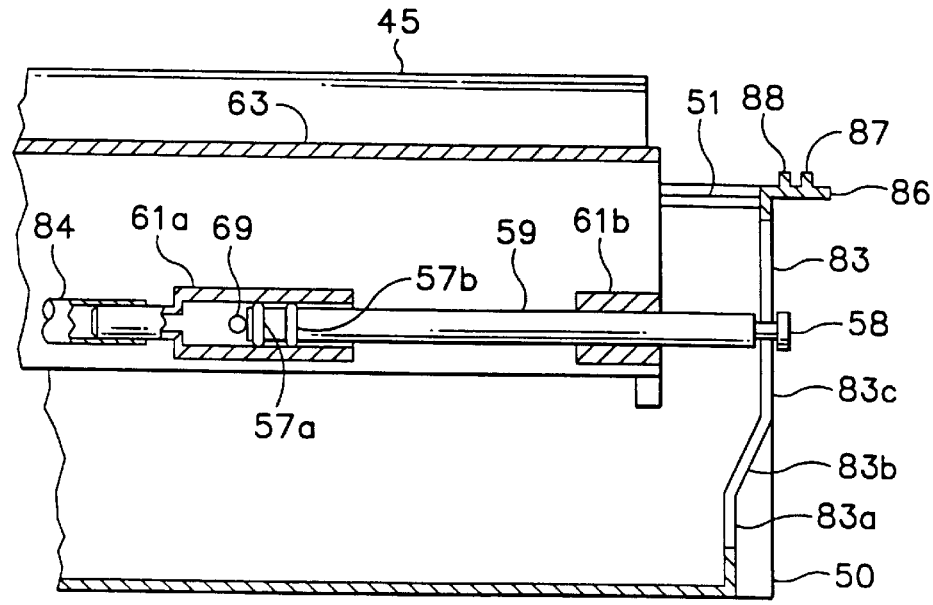
FIGS. 11A and 11B are top plan views of the oil bladder spool valve viewed along the lines 11A—11A of FIG. 10.
Figure 11B:
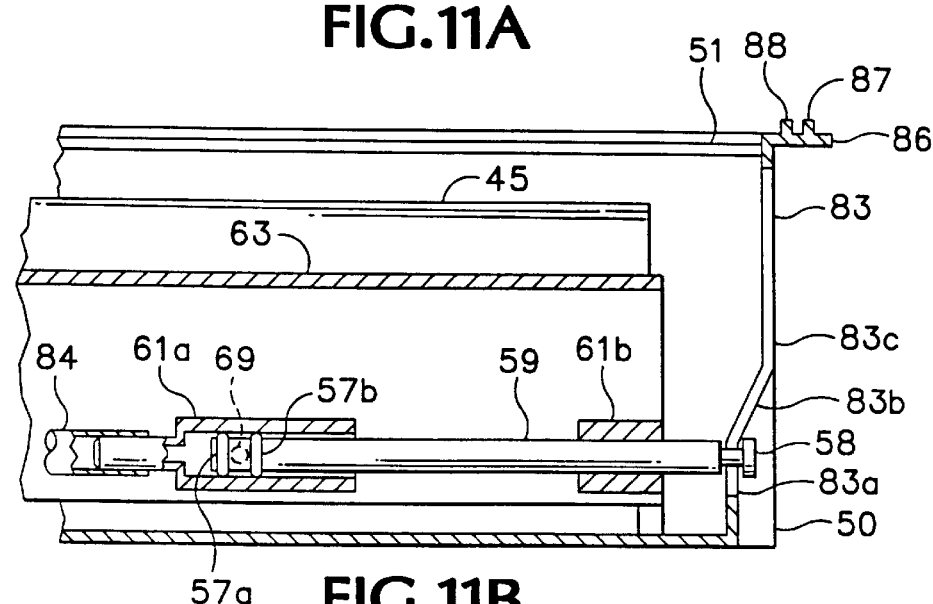
Figure 11C:
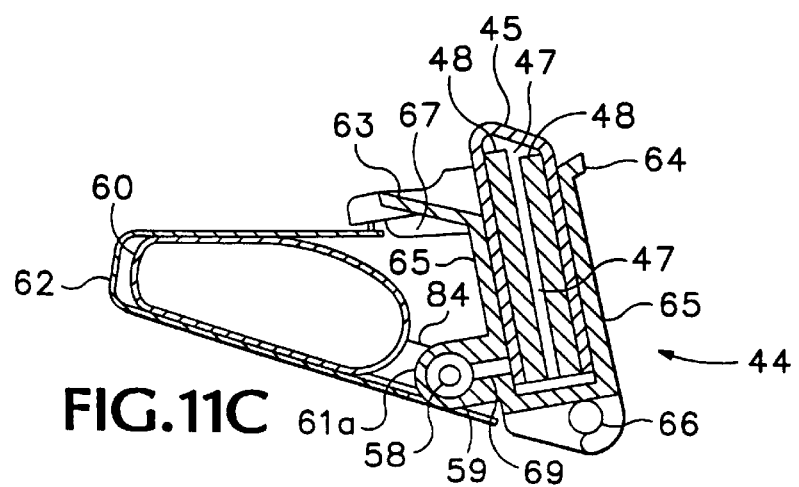
FIG. 11C is a side sectional elevational view of the wick assembly showing the oil bladder, spool valve and wick viewed along the lines 11C—11C of FIG. 10.

Wick channel 65 preferably comprises a plastic open-topped channel, best seen in FIG. 11C, into which is inserted the wick 45. The plastic can be a suitable acyrlonitrile butadiene styrene (ABS) or polycarbonate or any other appropriate plastic. Wick 45 has a molded plastic wick support 47 supporting it that is approximately in the shape of a "T" and extends from the exposed top down through the center of the channel 65 separating two pieces of wicking felt 48 and extends across substantially the width of the drum 19 or substantially the width of cartridge 28. The two pieces of wick felt 48 fit against the long stem in and under the top of the wick support 47. The wick 45 and the wicking felt 48 are made of appropriate felt materials that can be saturated with oil, such as the silicone oil used to form a liquid transfer surface on the support surface of drum 19 in the printer 10 employing the present invention. Wick channel 65, as seen in FIG. 11C, has an upwardly angled front lip 64 and an elongated upwardly angled oil recycle ledge 63 that extends outwardly from the wick 45 to catch overflow oil that comes off the blade 41 and the oil guide 85 (see FIGS. 7 & 8) to help direct oil back into the channel 65. Oil guide 85 can be a felt material or a serrated non-absorbent material with downwardly pointing extensions to facilitate uniform and directional control of the oil that is recycled from the blade 41 into the wick channel 65 and the wick 45. Lip 64 can also direct excess oil back into the wick channel 65 as the obliquely angled exposed contact surface of wick 45 applies oil to the rotating surface of drum 19 which moves in a direction that goes up the incline of the angled exposed contact surface of wick 45, best seen in FIGS. 8 and 11C. Wick 45 is preferably made of any appropriate non-woven synthetic absorbent textile with a relatively smooth surface. The configuration employs the smooth wick 45 mounted along side and atop the porous supporting wicking felt 48. Wicking felt 48 and web 56 can be any suitable material, such as a polyester felt. Suitable polyester felt materials are available commercially from Andrew Textile Industries as 100% polyester Microdenier needle felt for the wick 45 and from BMP Corporation as 100% polyester 1 Denier non-woven flatbond felt for the light reflective web 56, respectively.

Also seen in FIG. 11C is one of the two oil filled bladders 60 that are contained within the wicking assembly 44. Bladder 60 is preferably made of about a 5 mil thick polyurethane plastic or other suitable collapsible material so that the bladder 60 collapses as the oil empties out. The collapsing of the bladder 60 as the oil leaves evacuates the interior without creating a negative pressure that would draw air back inside in place of the oil, hindering and eventually stopping the flow of oil out into valve body 61. An oil bladder cover 62 positions and supports each bladder 60. It is made of any appropriately puncture resistant material, such as hard plastic or metal. The oil bladder 60 is secured to the wick channel 65 by metal clips 68 on the bladder cover 62 that fit within the oil bladder clip assemblies 67 (see briefly FIG. 9) which are found on opposing sides of the cartridge 28. A lift ear rod receiving bore 66 extends through the bottom of wick channel 65.

FIG. 11C also shows the notched spool valve stem 58 and the oil receiving needle valve body 61a that controls the flow of silicone oil from the oil bladder 60 to the wick 45. As best seen in FIGS. 11A–C, spool valve body 61(b) has the notched spool valve stem 58 that moves along a valve track 83 formed in the slot 43 of FIGS. 3–6 in each sidewall 50 of cartridge 28 from a fully lowered position, best seen in FIG. 11B, to a fully raised position, best seen in FIG. 11A, when the lift ear 39 is raised upwardly by the movement of the cam follower 38. As is best seen in FIGS. 11A and B, the notched spool valve stems 58 (only one of which is shown) follow the outward laterally moving path of the dog-legged tracks 83 on each adjacent sidewall 50 of the cartridge 28 and cause the valve spools 59 (also only one of which is shown) with their primary oil gasket seals 57a and secondary oil gasket seals 57b to move outwardly away from the center of cartridge 28 to expose the oil access cross bores 69 to permit oil to flow freely from the bladders 60 into the oil receiving spool valve bodies 61a and then into the bottom of the trough-like wick channel 65 via cross bores 69 (see briefly FIG. 11C). Once in the lower portion of channel 65, the oil saturates the wick 45 and the wicking felt 48 by absorption to permit the oil to be applied by the exposed surface of the wick 45 to the surface of the rotatable transfer drum 19 upon contact. Plugged oil filling tubes 84 permit oil to be fed into the bladders 60 to fill them.

Figure 10:
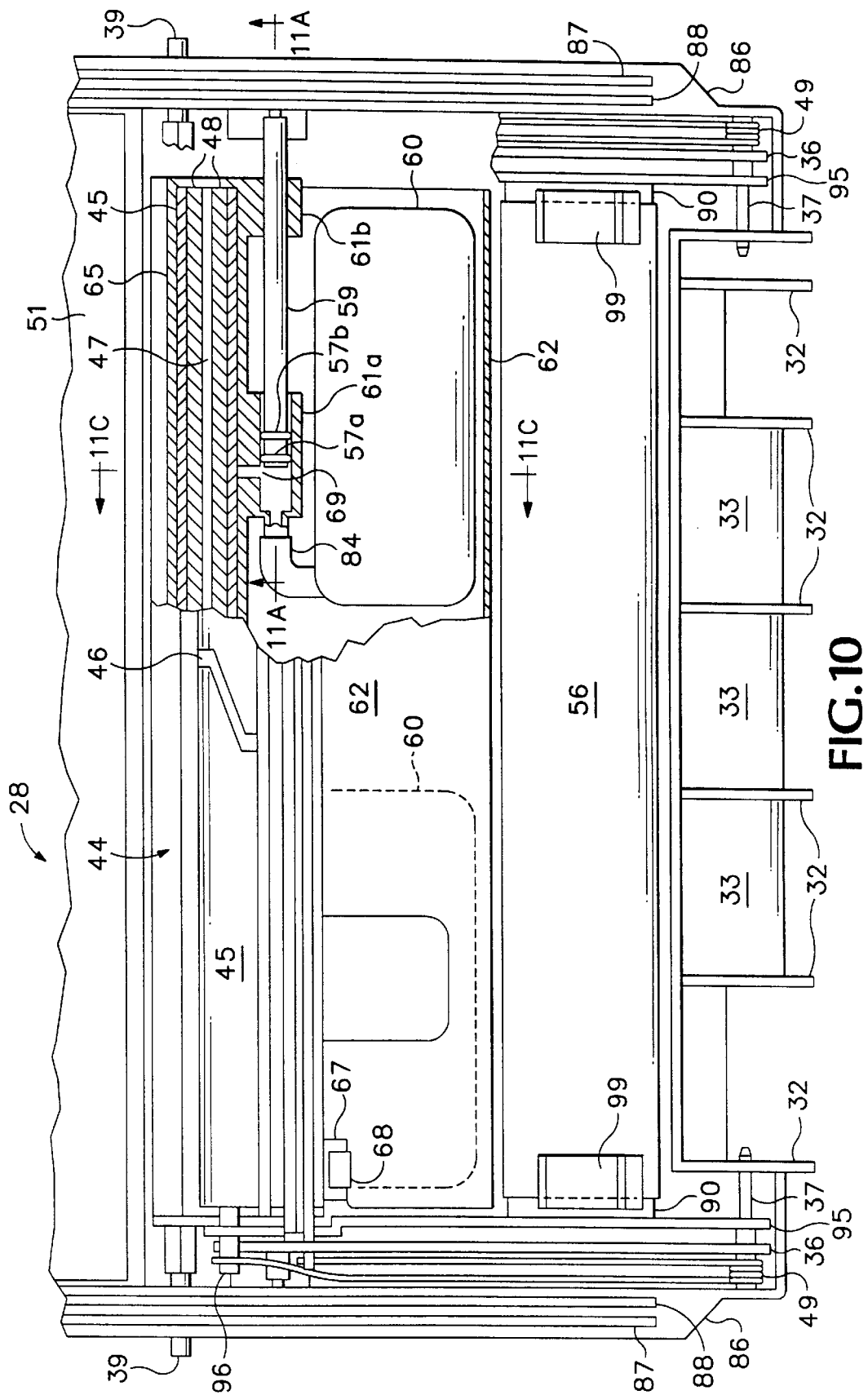
FIG. 10 is a top plan view of the removable drum maintenance cartridge with a portion of the cartridge broken away and a partial section taken through one side of the wick assembly showing the oil bladder, the oil bladder spool valve, and a sectional view of the wick channel.

Each wick assembly 44 has two bladders 60 to fill the wick channel 65 across its full width, as best seen in FIG. 10. Two wicks 45 can be employed, having the adjacent wicks 45 separated by a gap or space 46, best seen in FIGS. 9 and 10, to prevent over saturation and permit even distribution of oil across the full width of the wicking assembly 44. The space 46 is laterally angled across the top contact surface of wick 45 to ensure that no area of the surface of the drum 19 is untouched by the oil impregnated wick 45 during application of the liquid layer.

FIGS. 11A and 11B show the relative positions of the dog-legged spool valve tracks 83. At location 83a the valve spool 59 is fully inboard and has closed the flow of oil, at valve track position 83b lateral outward movement has started and the flow of oil is commencing, and at valve track position 83c the valve spool 59 is in its fully open position to allow through cross bore 69 unrestricted oil flow into channel 65. Inward lateral movement in the opposing direction by valve spool 59 closes the valve to restrict and ultimately stop the flow of oil through the cross bore 69. FIGS. 3–6 show the positioning of the spool valve slots 43 that extend laterally outwardly from the center of cartridge 28 as they get closer to the top of sides 50 of cartridge 28 to form the dog-legged spool valve tracks 83.

In practice, the wick assembly 44 is in the fully down position when the assembly is shipped outside of a printer 10 and the valve spool 59 in valve bodies 61(a) & (b) is in the fully closed position so no oil will flow out of bladder 60. Notched valve stem 58 is in the position 83a in valve track 83 shown in FIG. 11A. When the cartridge 28 is installed in a printer 10, the insertion causes the lift ear 39 to raise up the wick assembly 44 by the sliding on cam follower 38 to a park or hold position with the valve stem 58 in the intermediate position 83b in valve track 83 where it remains for a predetermined period with valve spool 59 open and oil flowing into the oil channel 65 through cross bore 69 to impregnate the wick 45 and prepare the wick assembly 44 for printing operation. After having been staged for the appropriate amount of time, the wick 45 is sufficiently impregnated with oil to permit a layer of liquid to be applied to the surface of the surface of the transfer drum 19 by raising the wick assembly 44 into contact with the surface of drum 19. At this position the notched spool valve stem 58 correspondingly is located as seen in FIG. 11A where both the wick 45 and the blade 41 are up and in contact with the surface of the drum 19. When the wick assembly 44 is lowered, the wick 45 loses contact first with the surface of transfer drum 19 and the blade 41 remains in contact to meter out the oil along its surface. The notched spool valve stem 58 in this position is midway between the location 83c and the location of stem 58 in the valve track 83 shown in FIG. 11A.

As the oil is applied to the support surface of the transfer drum 19, the blade 41, which may be formed of an elastomeric material, such as polyurethane or similar elastomer, uniformly distributes and removes excess fluid from the support surface of the transfer drum 19.

It is important in the distributing and metering of the oil for the intermediate transfer layer that the blade 41 be precisely positioned relative to the support surface of the transfer drum 19 and that the functional area of the blade not be deformed.

Figure 7:
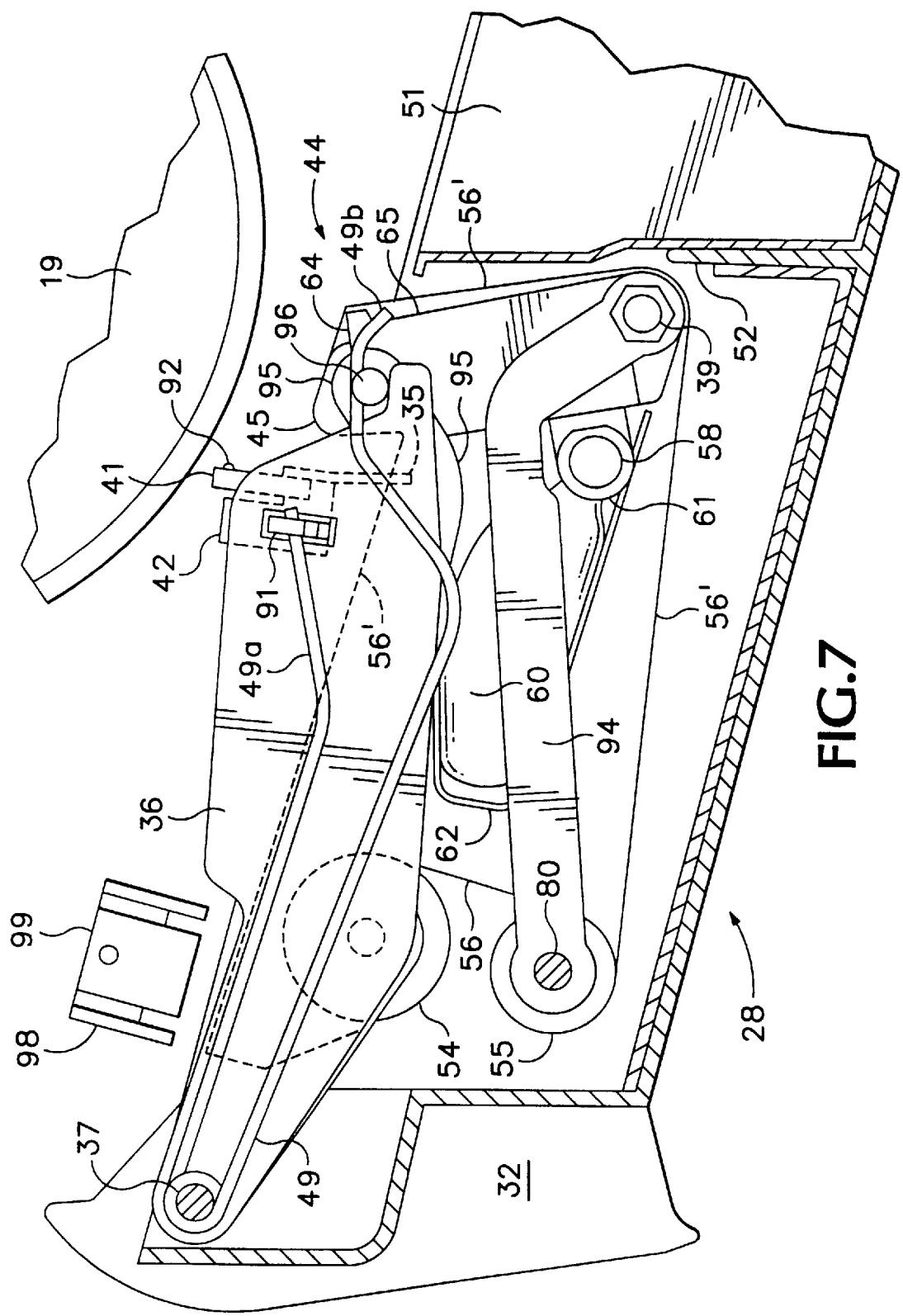
FIG. 7 is an enlarged diagrammatic illustration showing a portion of the drum maintenance cartridge and a portion of the transfer drum with the wick assembly in a partially raised position.
Figure 8:
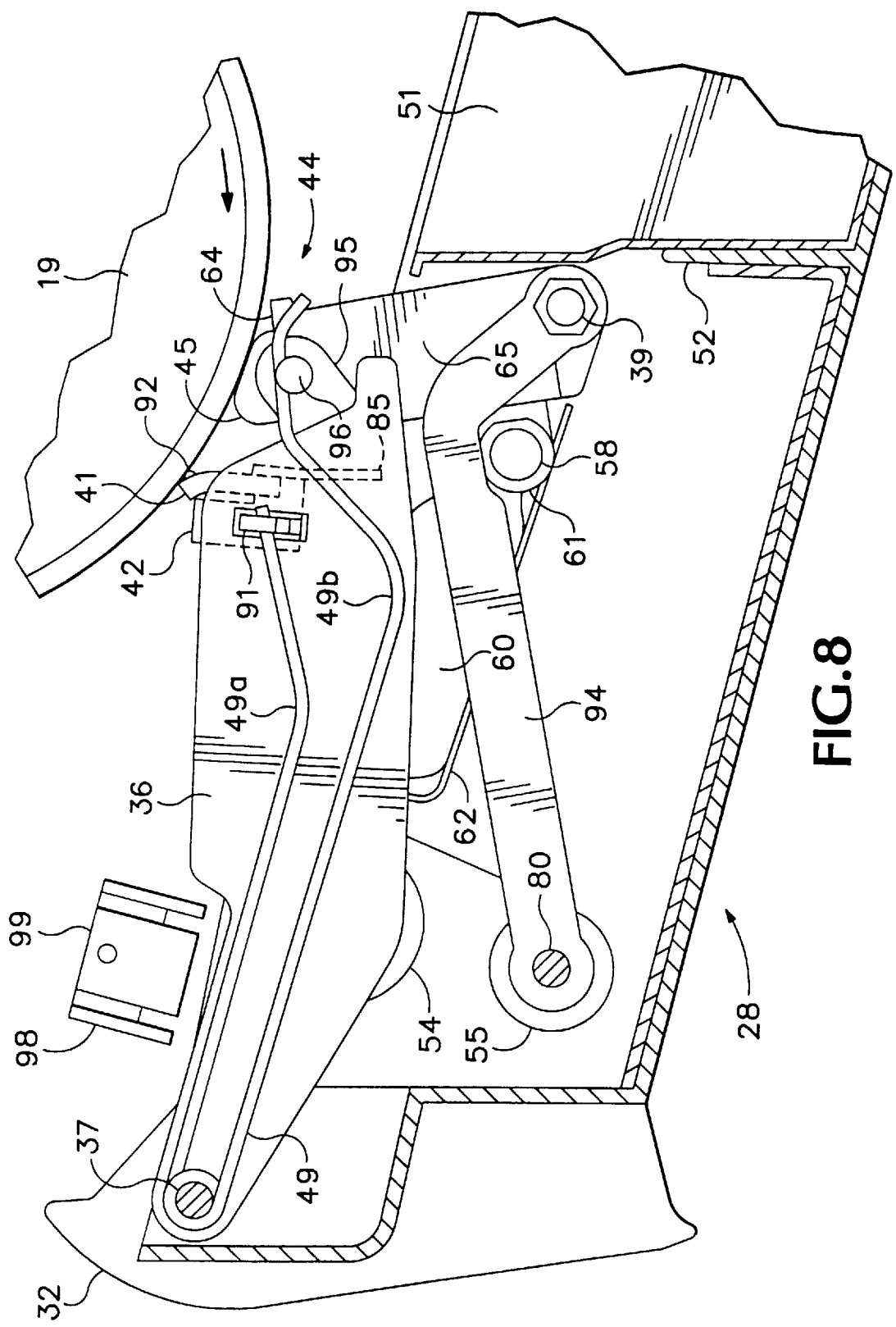
FIG. 8 is an enlarged diagrammatic illustration showing a portion of the drum maintenance cartridge and a portion of the transfer drum with the wick assembly in the fully raised position and the wick in contact with the transfer drum.
Figure 9:
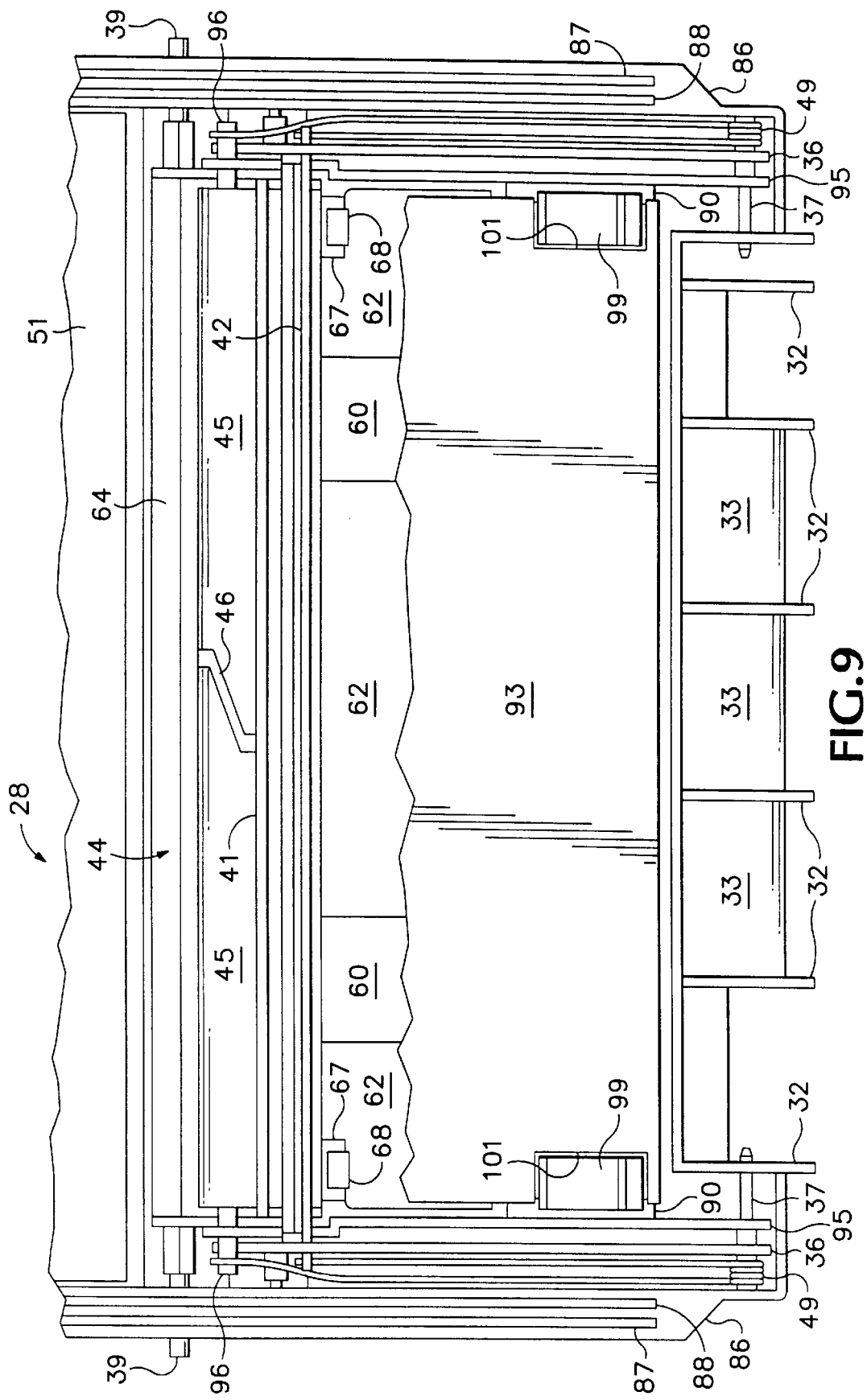
FIG. 9 is a top plan view of the removable drum maintenance cartridge with a portion of the cartridge broken away viewed along the lines 9—9 of FIG. 5.
Figure 13:
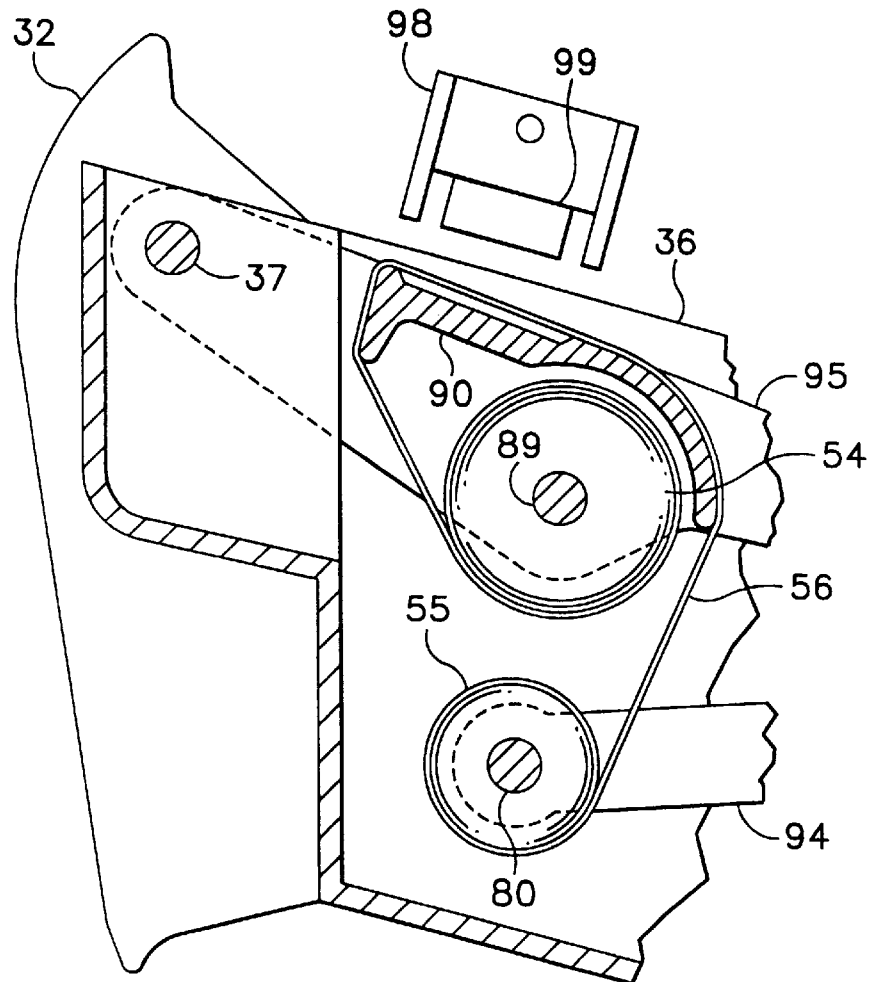
FIG. 13 is a partial side sectional viewed along the lines A—A of FIG. 10 showing the web take-up and supply roll system.

Web 56 is best shown in FIG. 13 and is shown in an alternatively configured embodiment in FIG. 7. Web 56 is formed of an appropriate gauze-like material such as a flat bonded non-woven polyester or similar material. As seen in FIG. 13, web 56 is fed from a web supply roll 54 about a web guide 90 downwardly to a web take-up roll 55 that is rotatably mounted on the lower wick assembly arm 94 via shaft 80. Supply roll 54 rotates about shaft 89. Web 56 is driven by the rotation of the web advance gear 34 of FIGS. 3, 5 and 6 which is engaged by the web supply drive gear 35 on the actual printer drive train. Web supply gear 35 is partially shown in FIGS. 5 and 6. Web guide 90 is a suitable molded plastic that spans substantially the width of cartridge 28 connecting the opposing upper wick assembly carrier arms 95 of FIGS. 9, 10 and 12, which are mounted about pivot pins 37.

FIG. 7 shows an alternative embodiment in which a web 56' of the same material as web 56 is played out under the blade mount 42, over the wick 45, and about the wick channel 65 from the web supply roll 54 to the web take-up roll 55. The longer web 56' can be employed if it is deemed necessary to add to the ability to provide a renewable cleaning surface for the surface of the transfer drum 19 continually during the imaging process by periodically advancing the web 56' to provide clean web material into the nip between the transfer drum 19 and the transfer roller 20. This requires that the web 56' be permeable to the oil that is dispensed from bladder 60 through the wick 45. However, the preferred embodiment is to use the wick 45 alone to clean the surface of the transfer drum.

In this later instance, the web 56 then serves the sole function of providing a sensing capability to determine when the cartridge 28 is ready for removal and replacement of the web assembly 44 with a new assembly with a fresh wick 45 and new oil in the two oil bladders 60. This configuration is best seen in FIG. 13 where web 56 is seen as described above across the web guide 90. To serve this purpose, a reflective optical web sensor 99, available commercially as a model EE-SF5-B reflective photomicrosensor from Omron Electronics, Inc. of Schaumburg, Ill., is employed and is mounted to the printer housing by a web sensor housing 98 to sense the optically reflective surface of the white colored web 56 as it passes over web guide 90. The housing 98 is suitable mounted to the printer cartridge drawer guide (not shown) Web guide 90 has non-reflective optical surfaces 97 which break the sensing of sensors 99 when the web 56 is not in the line of sight of the sensors 99.

FIGS. 12A–D show the web 56 as it appears to the two sensors 99 which are mounted on opposing sides of the cartridge 28 guides (not shown) in the printer housing that help position the cartridge 28 in the printer 10. FIG. 12A shows the web 56 with straight outer lateral edge on the left and a notch on the right when the web 56 is new and the cartridge 28 has been slid into place. FIG. 12B shows the web 56 with straight outer lateral edges on both sides in the normal operation condition which exists throughout most of the useful life of the cartridge 28. The notch 56a, or any indentation or recess in the straight lateral edge of the web 56 permits the sensors 99 to see through to one of the non-reflective surfaces 97 that are positioned on both sides of the web guide 90 and to break the sensing. When the web 56 initially is advanced so that the notch 56a in the right outer edge passes beyond the right web sensor 99. The configuration causes a sensing that tells the printer controller to invoke a time delay of about 15 minutes before commencing printing operations to permit the web 56 to become saturated with oil. Once the time delay is passed, the web 56 continues with straight outer lateral edges during printing operations for a period of time until the reflective sensings by sensors 99 change.

The left side of the web 56 maintains an even outer lateral edge until near the end of cartridge useful life. When the web 56 nears its end, the left side sensor 99 detects the non-reflection caused by a recessed configuration of the type shown in FIG. 12C as indented lateral edge 56b. This allows the printer controller (not shown) to receive data on the broken sensing and send a message to the panel display 74 that the cartridge 28 is nearing time for replacement. End of cartridge useful life is then determined by the printer cycle count of a predetermined number of printed output. This printing of output copies equal to the predetermined number is designed to occur prior to end of the left indentation 56c, as seen in FIG. 12D when the straight lateral edge is reached again. At the appropriate count, such as for example 200 prints, the controller causes a message to be displayed on the display panel 74 indicating that the cartridge 28 should be replaced.

Independent movement of the wick assembly 44 and the metering blade 41 produces a uniform distribution and thickness of the liquid intermediate transfer layer by preventing residual (untransferred) ink from contaminating the working area of the blade 41 and eliminating significant unwanted non-uniformities (puddling) in the liquid intermediate transfer layer. Actuating the wick assembly 44 brings the wick 45 into contact with the support surface of transfer drum 19 which removes contamination from its surface. The lowering of the wick 45 from the support surface of transfer drum 19 can leave areas of non-uniformity in the liquid intermediate transfer layer due to the dynamic contact between the support surface and the wick 45. Any areas of non-uniformity can be eliminated by leaving the blade 41 in contact with the support surface of drum 19 until the area left behind by the wick 45 has passed beyond the working area of the blade 41. Actuation of the wick assembly 44 and the blade 41 may also be made by means of any appropriate mechanism in addition to the cam follower 38, such as an air cylinder, an electrically actuated solenoid, or the like.

For uniform metering or distributing of the oil as the intermediate transfer layer, the blade 41 is configured in the preferred embodiment as a metering blade, as best seen in FIGS. 5–8 and 14. The blade 41 is positioned adjacent to the surface of the transfer drum 19 with the working or contact area being raised up off of the surface of drum 19 by the hydrodynamic pressure of the liquid transfer layer on the surface of the drum 19. In the preferred embodiment, the positioning of the blade and the hydrodynamic pressure of the liquid combine to produce an intermediate transfer layer having a generally uniform thickness of from about 0.02 to about 0.45 microns, with the preferred thickness estimated to be about 0.06 microns.

Figure 14:
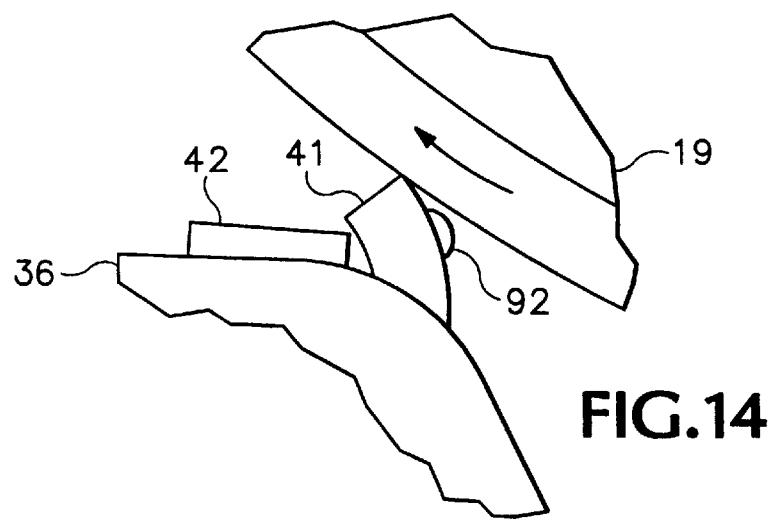
FIG. 14 is an enlarged diagrammatic illustration of the metering blade with its oil dam contacting the surface of the transfer drum 19.

The amount of oil applied to the support surface of the transfer drum 19 by the wick 45 should be adequate enough to form a continuous layer or supply of oil between the blade dam 92 of FIG. 14 and the top of the blade 41 along its working area as the blade 41 moves about the surface of the transfer drum 19 and meters the oil over the surface. The function of the blade dam 92 is to facilitate the lateral flow of the oil over the full width of the image area on drum 19 to help fill in areas of low oil volume. The flushing action of the oil over the surface of the blade 41 allows the blade to assist the wick 45 in cleaning the transfer drum 19. This area between the blade dam 92 and the top of the blade 41 is best seen in the diagrammatic illustration of FIG. 14. As the blade 41 is bent backwards while the transfer drum 19 rotates, the blade mount 42 that is suitably secured to the blade pivot arm 36 provides support to the rearward bending movement of the blade 41.

In operation the support surface of transfer drum 19 has a layer of liquid intermediate transfer surface applied to its surface by the action of the wick assembly 44. Assembly 44 is raised by the action of the actuator assembly (not shown) in the printer 10 drive train cam and cam follower 38 until the wick 45 is in contact with the surface of the drum 19.

The liquid, preferably silicone oil, flows out through the spool valve bodies 61 from the oil bladders 60 into the wick channel 65 through the oil access cross bores 69 as the valve spools 59 move laterally outwardly along the dog-legged valve tracks 83 while the wick assembly 44 is raised by sliding on the cam follower 38 when the cartridge 28 is inserted into the printer 10. The open-topped trough or wick channel 65 has the wick 45 and the wicking felt 48 become saturated by the oil impregnating and being absorbed by the wick 45 and the wicking felt 48. The oil retained within the wick 45 is deposited on the surface of the drum 19 while at the same time any foreign material on the drum surface is captured by the wick 45 material. The drum 19 rotates about a journalled shaft 31 in the direction shown in FIG. 4.

The blade 41 is raised to uniformly meter the liquid layer after the wick 45 of the wick assembly 44 has contacted the surface of the transfer drum 19 and started applying a new liquid layer on the transfer drum surface. This prevents any foreign material or untransferred ink left over from the previous imaging cycle from contaminating the working area of the blade 41.

Once the entire periphery of the drum 19 has been coated, the wick assembly 44 is lowered to a non-contact position. The blade 41 continues to meter the liquid over the surface of the drum 19 until the blade 41 passes over the region where the wick assembly 45 withdraws from the drum surface, whereupon the blade 41 pivots downwardly to a non-contact position. This delayed withdrawal of the blade 41 assures that no significant puddling is left on the surface of the drum 19 by the wick assembly 45. The result is a uniform liquid layer forming the intermediate transfer surface on the exterior of the drum 19.

Ink is applied to the exposed surface of the liquid intermediate transfer surface by the print head 26. The ink is applied in molten form, having been melted from its solid state form by appropriate heating means in the ink supply mechanism (both not shown). The ink image solidifies on the surface of the liquid by cooling to a malleable intermediate state. The drum 19 continues to rotate, advancing the sheet of print medium 13 that has entered the nip formed by the transfer roller 20 and the curved surface of the intermediate transfer surface which is supported by the drum 19. The ink image is deformed to its final image conformation and adhered to the final receiving surface or sheet of print medium 13 by being pressed thereagainst. The ink image is thus transferred and fixed to the sheet of print medium 13 by the pressure exerted on it in the nip by the resilient or elastomeric surface of the transfer roller 20. Stripper fingers help to remove the imaged final receiving surface or sheet of print medium sheet 13 from the liquid intermediate transfer surface as the drum 19 rotates. The ink image then cools to ambient temperature where it possesses sufficient strength and ductility to ensure its durability.

After the image is transferred to the final receiving surface or sheet of print medium 13 and before the next imaging, the wick assembly 45 and blade 41 are actuated to raise upward into contact with the drum 19 to replenish the liquid forming the intermediate liquid transfer surface on the supporting surface of the drum 19.

While the invention has been described above with reference to specific embodiments thereof, it is apparent that many changes, modifications and variations in the materials, arrangements of parts and steps can be made without departing from the inventive concept disclosed herein. For example, alternative end of useful life sensing systems for wick assembly 44 could be employed, such as the use of a lead screw that is driven by advance gear 34 to bring a reflective flag or surface under the sensors 99 in lieu of using web 56. Similarly, alternative means of moving the liquid from the reservoir to the contact surface of the wick 45 that employ capillary action without a felt material or pressure could be employed. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

What is claimed is:

1. A removable cartridge for use in an imaging apparatus for applying a liquid layer to a support surface comprising in combination:
   a) an applicator assembly for applying a liquid layer onto a support surface, the applicator assembly having a contact surface moveable between a first position and a second raised position for concurrently removing foreign matter from and applying the liquid onto the support surface, the contact surface further comprising a liquid impregnable wick;
   b) a liquid retaining reservoir connected to the applicator assembly and in fluid flow communication therewith to selectively provide a flow of liquid to the contact surface;
   c) valving means connected to the applicator assembly and the reservoir for selectively controlling the flow of liquid from the reservoir to the contact surface, the valving means being closed in an initial position corresponding to the first position of the applicator assembly and being moved to an opened position to permit liquid flow to the contact surface by the movement of the applicator assembly from the first position to the second raised position; and
   d) an open-topped channel connected to the applicator assembly and containing the liquid impregnable wick such that the contact surface extends out of and above the channel to be contactable with the support surface, the open-topped channel further having a bottom portion into which liquid flows through an access bore and into which the wick extends downwardly and into fluid flow communication with the liquid from the reservoir when the valving means permit the liquid to flow thereinto.

2. The apparatus according to claim 1 wherein the valving means is open and liquid flow commences at a position intermediate the first position and the second raised position.

3. The apparatus according to claim 2 wherein the contact surface is formed of an absorbent material.

4. The apparatus according to claim 3 wherein the absorbent material is a synthetic non-woven textile.

5. The apparatus according to claim 4 wherein the synthetic non-woven textile is a polyester felt.

6. The apparatus according to claim 2 wherein the contact surface is obliquely angled with respect to a direction of movement of the support surface.

7. The apparatus according to claim 2 wherein the open-topped channel further has on a first side an upwardly angled lip from the contact surface nearest to the direction of movement of the support surface to direct excess liquid back into the open-topped channel.

8. The apparatus according to claim 7 wherein the open-topped channel further has on a second side an elongated and upwardly angled ledge from the contact surface in the direction of movement of the support surface to direct liquid back into the open-topped channel.

9. The apparatus according to claim 8 wherein the open-topped channel further has a support that extends upwardly and out of the channel between the first side and the second side beneath and in supporting contact with the wick.

10. The apparatus according to claim 2 wherein the valving means further comprises a valve stem that is moveable in a first direction and an opposing second direction, movement in the first direction opening the valving means to selectively permit the flow of liquid and movement in the opposing second direction closing the valving means to restrict and ultimately stop the flow of liquid.

11. The apparatus according to claim 10 wherein the cartridge further comprises lifting apparatus connected to the applicator assembly effective to move the applicator assembly and the contact surface between the first position and the second raised position.

12. The apparatus according to claim 11 wherein the cartridge further comprises valve tracks cooperative with the valving stem to move the valve stem in the first direction to open and the opposing second direction to close the flow of liquid, the valve tracks guiding the valve stem as the applicator assembly and the contact surface move between the first position and the second raised position.

13. The apparatus according to claim 12 wherein the valve stem further includes a notch that fits within and follows the valve tracks as the valve stem moves upwardly with the applicator assembly and in the first direction to open the flow of liquid and downwardly with the applicator assembly and in the second direction to close the flow of liquid.

14. The apparatus according to claim 13 wherein the cartridge has opposing sidewalls and the valve tracks are located in an adjacent sidewall.

15. The apparatus according to claim 14 wherein the movement of the valve stem is lateral, moving outwardly toward the cartridge adjacent sidewall as the valve stem moves upwardly in the valve tracks and moving inwardly away from the cartridge adjacent sidewall as the valve stem moves downwardly in the valve tracks, the valve tracks being dog-legged outwardly as the valve stem moves upwardly therein.

16. The apparatus according to claim 11 wherein the applicator assembly further includes means for metering the liquid layer uniformly on the support surface.

17. The apparatus according to claim 16 wherein the applicator assembly and the metering means are independently moveable with respect to each other in a cooperative unit in the removable cartridge.

18. The apparatus according to claim 17 further comprising means for controlling the applicator assembly and the metering means with the applicator assembly being positionable against the support surface after the metering means and being removable from the support surface before the metering means.

19. The apparatus according to claim 18 further comprising the means for independently controlling the applicator assembly and the metering means with the applicator assembly being a four bar linkage.

20. The apparatus according to claim 19 wherein the metering means comprises an elastomeric blade disposed adjacent to the support surface for removing foreign matter from and uniformly distributing the liquid on the support surface.

21. The apparatus according to claim 20 wherein the blade further includes a dam on a blade surface closest to a direction of movement of the support surface to collect and retain a sufficient supply of liquid to ensure that a continuous uniform layer of liquid is applied to the support surface.

22. The apparatus according to claim 20 wherein the blade further includes a guide adjacent a blade surface closest to the direction of movement of the support surface to uniformly collect and directionally control liquid that is recycled from the blade and back into the open-topped channel.

23. The apparatus according to claim 21 further comprising the liquid retained in the reservoir being selected from the group consisting of water, fluorinated oils, glycol, surfactants, mineral oil, silicone oil, functional oils and combinations thereof.

24. The apparatus according to claim 21 further comprising the liquid retained in the reservoir being an oil.

25. The apparatus according to claim 24 further comprising the liquid retained in the reservoir being silicone oil.

26. The apparatus according to claim 23 further comprising the reservoir retaining the liquid being a collapsible plastic bladder.

27. The apparatus according to claim 26 further comprising the application assembly having a plurality of bladders in fluid flow communication with a corresponding number of wicks mounted side by side in the applicator assembly, the wicks being separated by a laterally angled gap.

28. The apparatus according to claim 2 wherein the cartridge is inserted in an imaging apparatus which further comprises a printer.

29. The apparatus according to claim 28 wherein the printer further comprises an ink jet printer.

30. The apparatus according to claim 29 wherein the ink jet printer further comprises a phase change ink jet printer.

31. The apparatus according to claim 30 wherein the phase change ink jet printer further includes an ink jet print head which selectively ejects ink for forming an ink image on an exposed surface of the liquid layer on the support surface.

32. The apparatus according to claim 31 wherein the the support surface is a rotatable drum mounted to the printer.

33. The apparatus according to claim 32 wherein the printer further comprises a transfer apparatus that includes a roller to pressure fuse an ink image to a final receiving medium by deforming the ink image and adhering the image thereto.

34. The apparatus according to claim 28 wherein the applicator assembly further includes sensing means for sensing an end of useful life of the applicator assembly.

35. The apparatus according to claim 34 wherein the sensing means further includes a sensor on the printer to sense a warning indicator in the applicator assembly that the end of useful life is near.

36. The apparatus according to claim 34 wherein the sensing means further includes a sensor on the printer to sense a warning indicator in the applicator assembly that the end of useful life has been reached and replacement of the cartridge in the printer is necessary.

37. The apparatus according to claim 1 wherein the cartridge further includes a removable waste ink receptacle mounted in the cartridge.

38. A removable cartridge for use in an indirect imaging apparatus for applying a liquid layer to a support surface comprising in combination:

a) an applicator assembly for applying a liquid layer onto a support surface, the applicator assembly having a contact surface moveable between a first position and a second raised position for concurrently removing foreign matter from and applying the liquid onto the support surface, the contact surface further comprising a liquid impregnable wick;

b) a liquid retaining reservoir connected to the applicator assembly and in fluid flow communication therewith to selectively provide a flow of liquid to the contact surface, the reservoir being collapsible as the liquid flows out to prevent the creation of negative pressure drawing air back there into; and c) valving means connected to the applicator assembly and the reservoir for selectively controlling the flow of liquid from the reservoir to the contact surface, the valving means being closed in an initial position corresponding to the first position of the applicator assembly and being moved to an opened position to permit liquid flow to the contact surface by the movement of the applicator assembly from the first position to the second raised position, the valving means further comprising a valve stem that is movable in a first direction and an opposing second direction, movement in the first direction opening the valving means to selectively permit the flow of liquid to the applicator assembly and in the opposing second direction closing the valving means to restrict and ultimately stop the flow of liquid to the applicator assembly.

39. The apparatus according to claim 38 wherein the liquid retaining reservoir further comprises a collapsible bladder that collapses as liquid flows out to prevent negative air pressure from occurring.

* * * * *